US009169982B2

(12) United States Patent
Hsieh et al.

(10) Patent No.: US 9,169,982 B2
(45) Date of Patent: Oct. 27, 2015

(54) LAMP

(75) Inventors: Yi-Chu Hsieh, New Taipei (TW); Hui-Feng Jen, New Taipei (TW); Che-Hsin Liao, New Taipei (TW); Jia-Yi Juang, New Taipei (TW)

(73) Assignees: Cal-Comp Electronics & Communications Company Limited, New Taipei (TW); Kinpo Electronics, Inc., New Taipei (TW)

( * ) Notice: Subject to any disclaimer, the term of this patent is extended or adjusted under 35 U.S.C. 154(b) by 605 days.

(21) Appl. No.: 13/572,707

(22) Filed: Aug. 13, 2012

(65) Prior Publication Data

US 2013/0170236 A1 Jul. 4, 2013

Related U.S. Application Data

(60) Provisional application No. 61/582,399, filed on Jan. 1, 2012.

(30) Foreign Application Priority Data

Feb. 14, 2012 (TW) ............................. 101104679 A

(51) Int. Cl.

*F21V 19/02* (2006.01)
*F16C 11/00* (2006.01)
*F16D 3/00* (2006.01)
*F16B 7/10* (2006.01)

(Continued)

(52) U.S. Cl.

CPC . *F21K 9/58* (2013.01); *F21V 21/30* (2013.01); *F21S 6/00* (2013.01); *F21V 19/02* (2013.01)

(58) Field of Classification Search

CPC ............. F21K 9/58; F21K 9/13; F21V 21/30; F21V 15/01; F21V 19/02; F21V 19/006; F21V 19/0065; F21V 19/007; F21S 6/00; H01K 1/46; H01K 1/465; H01J 5/54

USPC ......... 313/318.09; 403/97, 98, 103, 104, 106, 403/107

See application file for complete search history.

(56) References Cited

U.S. PATENT DOCUMENTS

| | | | | |
|---|---|---|---|---|
| 8,201,975 | B1 * | 6/2012 | Chen et al. | 362/269 |
| 8,591,080 | B2 * | 11/2013 | Hsieh et al. | 362/437 |

(Continued)

FOREIGN PATENT DOCUMENTS

| | | |
|---|---|---|
| TW | M332788 | 5/2008 |
| TW | I324236 | 5/2010 |

(Continued)

*Primary Examiner* — Evan Dzierzynski
*Assistant Examiner* — Erin Kryukova
(74) *Attorney, Agent, or Firm* — Jianq Chyun IP Office

(57) ABSTRACT

A lamp includes a first housing, a second housing, a bulb base and a positioning part. The first housing has a first sidewall and a second sidewall. The first sidewall is perpendicularly connected to the second sidewall and has a first surface and a first assembling tank penetrating through the first surface. The second sidewall has a first cave. The second housing is detachably assembled to the first housing and has a second cave. These two caves form a first opening. The bulb base is embedded into the first opening. The bulb base has a base opening and multiple slots. The slots are disposed on an inner sidewall of the base opening along a circular direction. The positioning part is disposed in the first assembling tank and suitable to move along a normal direction of the first surface. The positioning part has a first push button and a latch hook.

11 Claims, 9 Drawing Sheets

(51) Int. Cl.

| | |
|---|---|
| ***F21K 99/00*** | (2010.01) |
| ***F21V 21/30*** | (2006.01) |
| *F21S 6/00* | (2006.01) |

(56) References Cited

U.S. PATENT DOCUMENTS

| | | | | |
|---|---|---|---|---|
| 8,684,567 | B2 * | 4/2014 | Hsieh et al. | 362/362 |
| 8,801,236 | B2 * | 8/2014 | Hsieh et al. | 362/362 |
| 2011/0305012 | A1 * | 12/2011 | Lo | 362/218 |
| 2012/0236602 | A1 * | 9/2012 | Flaherty et al. | 362/650 |

FOREIGN PATENT DOCUMENTS

| | | |
|---|---|---|
| TW | M391058 | 10/2010 |
| TW | 201104137 | 2/2011 |
| TW | M397481 | 2/2011 |
| TW | I343976 | 6/2011 |
| TW | 201122356 | 7/2011 |
| TW | M412304 | 9/2011 |
| TW | M414788 | 10/2011 |
| TW | M416019 | 11/2011 |
| TW | M422029 | 2/2012 |

* cited by examiner

LAMP

CROSS-REFERENCE TO RELATED APPLICATION

This application claims the priority benefits of U.S. provisional application Ser. No. 61/582,399, filed on Jan. 1, 2012 and Taiwan application serial no. 101104679, filed on Feb. 14, 2012. The entirety of each of the above-mentioned patent applications is hereby incorporated by reference herein and made a part of this specification.

BACKGROUND OF THE INVENTION

1. Field of the Invention

The invention relates to a lamp. Particularly, the invention relates to a lamp in which a housing of the lamp is capable of rotating relative to a bulb base.

2. Description of Related Art

In daily life, people usually use a table lamp to illuminate an area lacking of indoor light. For example, an area with inadequate illumination such as a desk or a table can be reinforced by using a table lamp, so that a user can read or engage in other works without worrying deterioration of eyesight caused by inadequate working environment light.

In order to enhance evenness of a light source, a commonly used table lamp in the market generally includes an optical plate, and the optical plate is assembled with a light-emitting device to form a module. A most easy manner of assembling the module to a base is to respectively configure a thread portion on the module and the base, and then the module is manually screwed to the thread portion. However, after the module is screwed to a fixed position, if an angle of a light-emerging surface of the table lamp is not an irradiation angle required by the user, the lamp is required to be reassembled, or is forcibly rotated to a desired position, which is inconvenient in utilization and is liable to cause a damage of the base.

SUMMARY OF THE INVENTION

The invention is directed to a lamp, wherein a rotational degree of a housing relative to a bulb base can be slightly adjusted after the housing is fixed to the bulb base.

The invention provides a lamp including a first housing, a second housing, a bulb base and a positioning part. The first housing includes a first sidewall and a second sidewall. The second sidewall is perpendicularly connected to the first sidewall, and the first sidewall has a first surface and a first assembling tank penetrating through the first surface. The second sidewall has a first cave. The second housing is detachably assembled to the first housing, and has a second cave. The second cave and the first cave form a first opening. The bulb base is embedded in the first opening and assembled to the first housing and the second housing. The bulb base has a base opening and a plurality of slots. The slots are disposed on an inner sidewall of the base opening along a circular direction of the base opening. The positioning part is disposed in the first assembling tank and is adapted to move in the first assembling tank along a normal direction of the first surface. The positioning part has a first push button and a latch hook, where the first push button is disposed in the first assembling tank, and an extending direction of the latch hook is perpendicular to the normal direction, and the latch hook is buckled to one of the slots.

In an embodiment of the invention, the second housing has a second assembling tank disposed opposite to the first assembling tank.

In an embodiment of the invention, the positioning part has a second push button connected to the first push button and the latch hook, and the second push button disposed in the second assembling tank is adapted to move in the second assembling tank long the normal direction.

In an embodiment of the invention, the lamp further includes an elastic part disposed in the second assembling tank, wherein the positioning part leans against the elastic part, and when the positioning part presses the elastic part, the elastic part is deformed along the normal direction.

In an embodiment of the invention, the lamp further includes a stop part, and the first housing further has a pair of assembling pillars disposed on the first surface and located at opposite sides of the first assembling tank. The stop part is detachably assembled to the assembling pillars of the first housing and leans against the first assembling tank for limiting a moving distance of the positioning part in the first assembling tank.

In an embodiment of the invention, the lamp further includes at least one elastic part disposed in the first assembling tank, and two ends of the elastic part respectively lean against the positioning part and the stop part, and when the positioning part presses the elastic part, the elastic part is deformed along the normal direction.

In an embodiment of the invention, the positioning part has at least one convex pillar connected to the first push button and the latch hook, the at least one convex pillar extends towards a direction away from the first push button, and the at least one elastic part sleeves the at least one convex pillar.

In an embodiment of the invention, the lamp further includes a pair of lock part penetrating through the stop part and locked into the pair of assembling pillars.

In an embodiment of the invention, the bulb base includes a main body and a base. The main body has a groove. The base is detachably assembled to the groove of the main body, wherein the base opening and the slots are disposed on the base.

In an embodiment of the invention, each of the slots has at least one first slope, and when the first housing and the second housing that are assembled together rotate relative to the bulb base, the latch hook is adapted to move along the at least one first slope, and when the latch hook detaches the at least one first slope, the latch hook is buckled to a next slot.

In an embodiment of the invention, the latch hook of the positioning part has at least one second slope facing to the first slope.

According to the above descriptions, in the lamp of the invention, the positioning part and the elastic part are configured on the housing, and the positioning part can be buckled to the base opening to fix the housing on the base. When it is required to adjust a light-emerging angle, the user can press the push button to move the positioning part to release a buckle relation between the positioning part and the base. In this way, the housing can rotate relative to the bulb base. Moreover, by configuring the elastic part on the positioning part, a user can release the buckle relation through a single push button, so as to adjust an angle of a light-emerging surface of the lamp relative to the user.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1A:
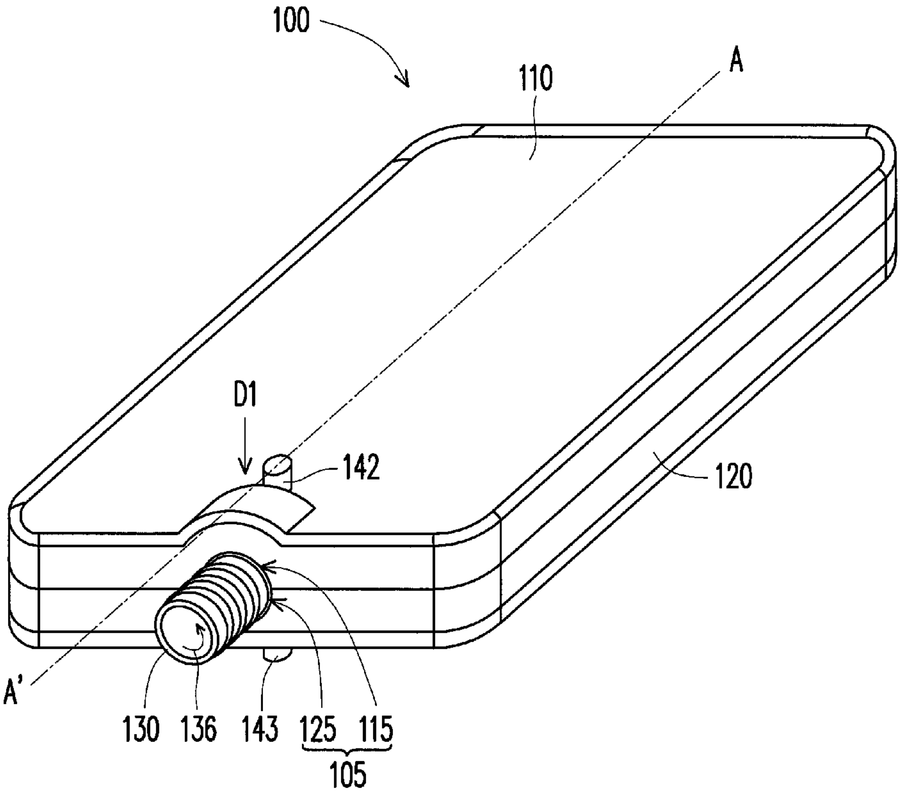
FIG. 1A is a three-dimensional view of a lamp according to an embodiment of the invention.
Figure 1B:
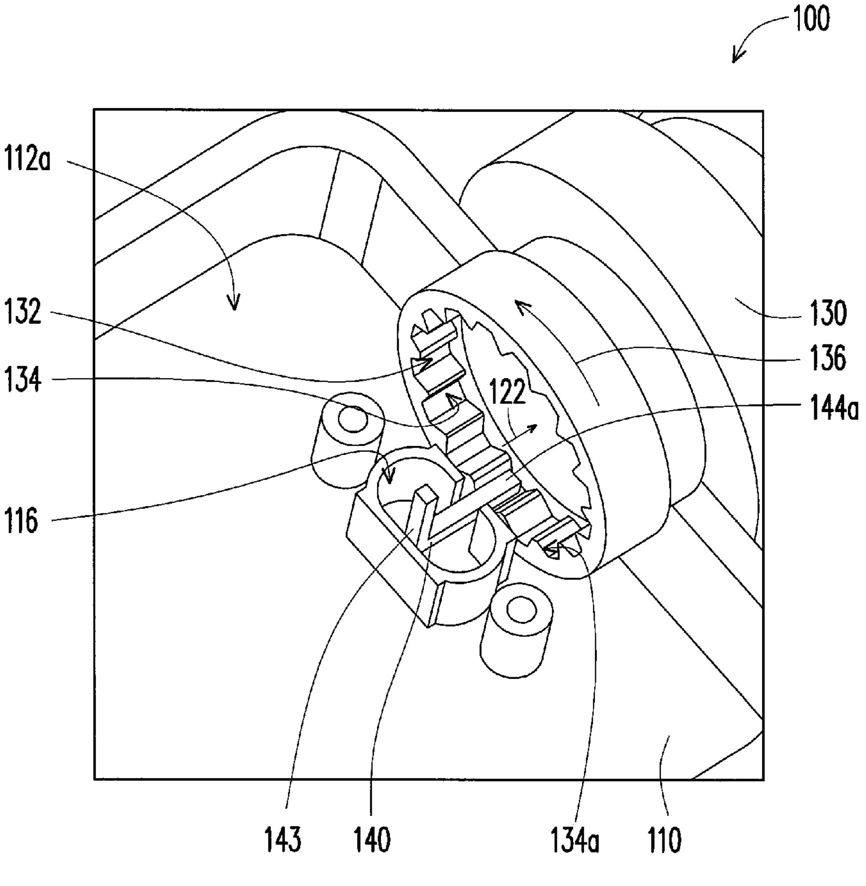
FIG. 1B is a partial enlarged view of a bulb base and a positioning part of FIG. 1A.
Figure 2A:
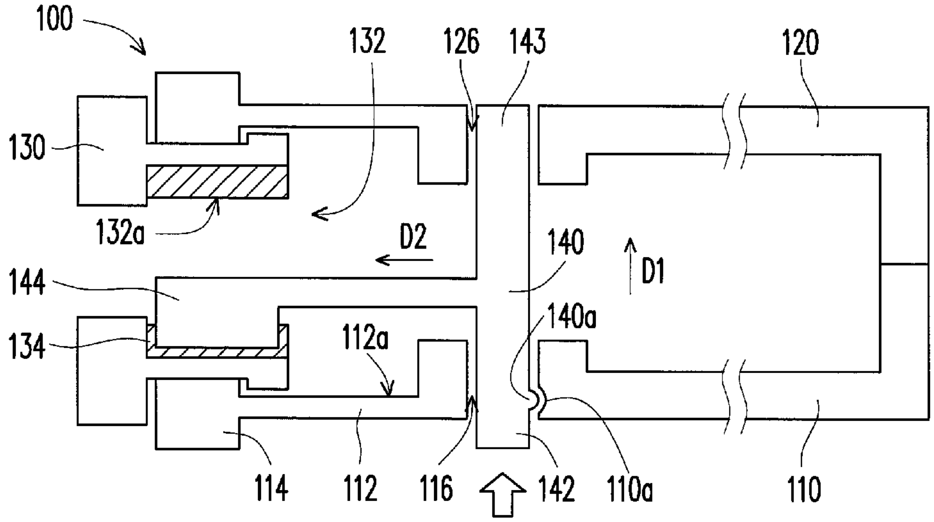
FIG. 2A is a cross-sectional view of the lamp of FIG. 1A along a line A-A'.
Figure 2B:
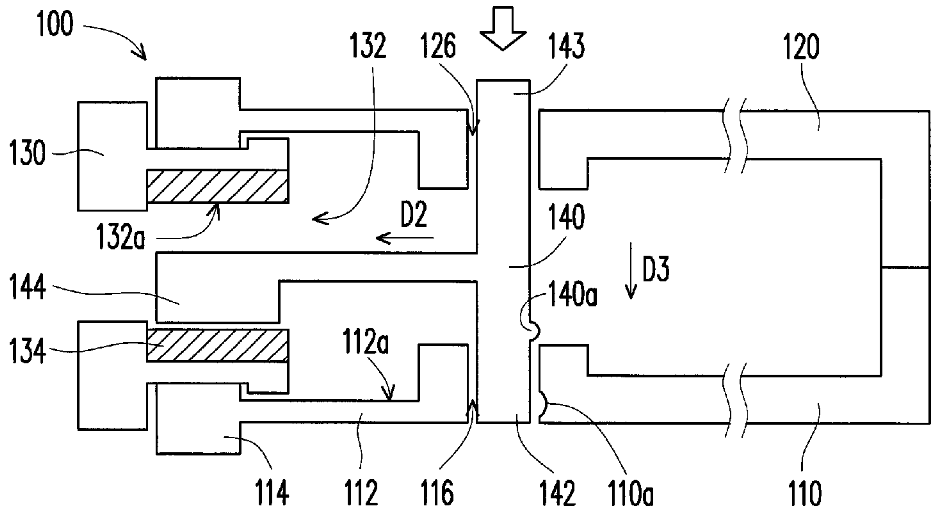
FIG. 2B is a cross-sectional view of the lamp of FIG. 2A after a positioning part is pressed.

FIG. 1A is a three-dimensional view of a lamp according to an embodiment of the invention. FIG. 1B is a partial enlarged view of a bulb base and a positioning part of FIG. 1A. FIG. 2A is a cross-sectional view of the lamp of FIG. 1A along a line A-A'. FIG. 2B is a cross-sectional view of the lamp of FIG. 2A after a positioning part is pressed. Referring to FIG. 1A to FIG. 2B, the lamp 100 of the present embodiment includes a first housing 110, a second housing 120, a bulb base 130 and a positioning part 140. The first housing 110 includes a first sidewall 112 and a second sidewall 114, wherein the second sidewall 114 is perpendicularly connected to the first sidewall 112, and the first sidewall 112 has a first surface **112*a* and a first assembling tank 116 penetrating through the first surface 112*a*. The second sidewall 114 has a first cave 115. The second housing 120 is detachably assembled to the first housing 110 and has a second cave 125. The second cave 125 and the first cave 115 form a first opening 105**.

The bulb base 130 is embedded in the first opening 105 and is assembled to the first housing 110 and the second housing 120. The bulb base 130 has a base opening 132 and a plurality of slots 134. The slots 134 are disposed on an inner sidewall **132*a* of the base opening 132 along a circular direction 136 of the base opening 132. The positioning part 140 is disposed in the first assembling tank 116 and is adapted to move in the first assembling tank 116 along a normal direction D1 of the first surface 112*a*. The positioning part 140 has a first push button 142 and a latch hook 144, wherein the first push button 142 is disposed in the first assembling tank 116, and an extending direction D2 of the latch hook 144 is perpendicular to the normal direction D1, and the latch hook 144 is buckled to one of the slots 134**.

When the lamp 100 of the present embodiment is in a state shown in FIG. 1A, the first push button 142 protrudes out from the first housing 110, as that shown in FIG. 2A. When the user presses along the normal direction D1 to move the first push button 142 of the positioning part 140 in FIG. 2A along the normal direction D1, the latch hook 144 of the positioning part 140 moves to a position shown in FIG. 2B along the normal direction D1. Now, a buckle relation between the latch hook 144 and the slot 134 is released, and the first housing 110 and the second housing 120 that are assembled together can rotate relative to the bulb base 130 along the circular direction 136 of the bulb base 130. In this way, after the lamp 100 is assembled, an irradiation angle of the lamp 100 relative to a table can be easily adjusted according to a user's requirement, therefore adjusting the irradiation angle of the bulb base 130 relative to the first housing 110 and the second housing 120 that are assembled together by reworking the lamp 100 is avoided, and further avoiding damaging the lamp 100 by the user due to forcibly rotate the lamp 100 relative to a lamp stand.

In the present embodiment, the positioning part 140 further has a second push button 143 connected to the first push button 142 and the latch hook 144. The second housing 120 further has a second assembling tank 126, and the second assembling tank 126 is disposed opposite to the first assembling tank 116. The second push button 143 is disposed in the second assembling tank 126 and adapted to move in the second assembling tank 126 along the normal direction D1. When the lamp 100 is in a state shown in FIG. 2B, and the user presses the second push button 143, the positioning part 140 moves along a second normal direction D3 opposite to the first normal direction D1, and the latch hook 144 is again buckled to the slot 134, and the bulb base 130 is fixed relative to the first housing 110 and the second housing 120 that are assembled together.

In an embodiment of the invention, each of the slots 134 on the bulb base 130 has at least one first slope **134*a*, and the first slope 134*a* is disposed in the slot 134 in a way facing to the latch hook 144**.

When the first housing 110 and the second housing 120 that are assembled together rotate relative to the bulb base 130, the latch hook 144 first moves along the first slope **134*a*, and the latch hook 144 is buckled to a next slot 134 after detaching from the first slope 134*a*. Only one first slope 134*a* or two first slopes can be disposed in the slot 134, such that when the first housing 110 and the second housing 120 rotate relative to the bulb base 130, the latch hook 144 moves relative to the first slope 134*a* and detaches from the slot 134 to release the buckle relation therebetween, and the latch hook 144 further contacts the first slope 134*a* of a next slot 134 and is guided by the first slope 134*a* for buckling to the next slot 134. To facilitate mutual guiding and engaging between the latch hook 144 and the slot 134, the latch hook 144 of the positioning part 140 may further have at least a second slope 144*a*, wherein the second slope 144*a* faces to the first slope 134*a*. Moreover, surfaces of the latch hook 144 and the slot 134 can be fabricated into rough surfaces through texture processing to increase a surface friction, so that when the latch hook 144 is buckled to the slot 134, sliding there between the latch hook 144 and the slot 134 is avoided, which improves steady of the buckled latch hook 144 and the slot 134**.

The positioning part 140 of the present embodiment can be a plastic part or a metal part with high rigidity, and when the latch hook 144 of the positioning part 140 is buckled to the slot 134, the positioning part 140 may further have at least one bump **140*a*, and the first housing 110 may further have at least one concave 110*a*, and positions of the bump 140*a* and the concave 110*a* correspond to each other, which forms a structural interference to ensure that the latch hook 144 is indeed buckled to the slot 134, and avoids a situation that the latch hook 144 is detached from the slot 134 before the user presses the first push button 142. However, a fixing relation between the positioning part 140 and the first housing 110** in the present embodiment is not limited by using bumps and concaves but depending upon actual requirements.

Figure 2C:
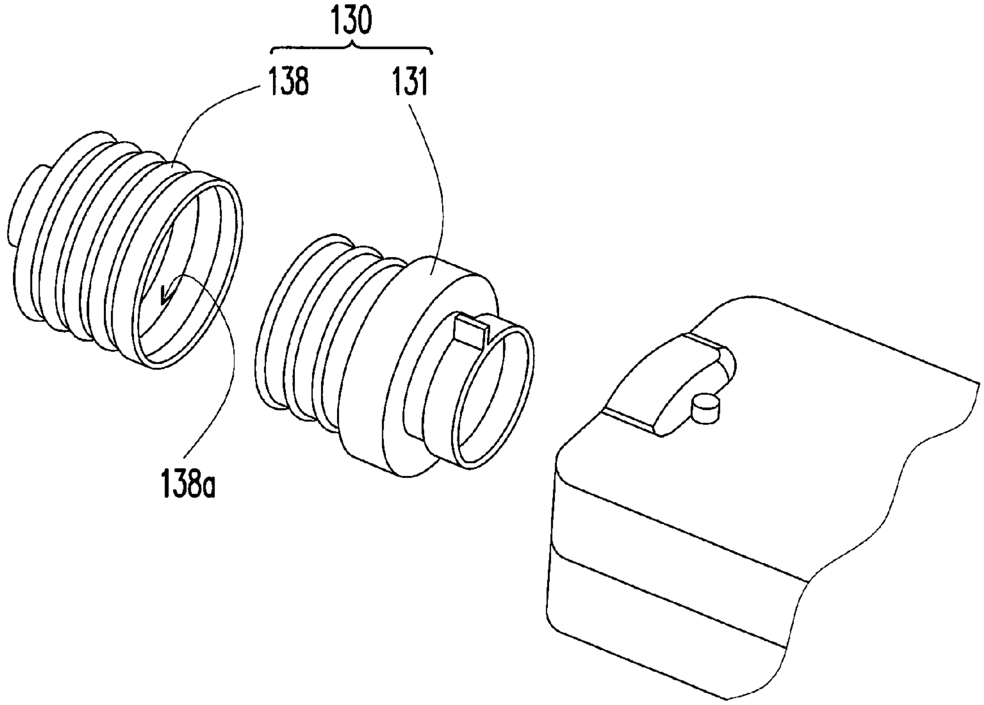
FIG. 2C is an exploded view of a bulb base according to an embodiment of the invention.

FIG. 2C is an exploded view of a bulb base according to an embodiment of the invention. Referring to FIG. 2C, the bulb base 130 assembled with the first housing 110 and the second housing 120 includes a main body 138 and a base 131. The main body 138 has a groove 138*a*. The base 131 is detachably assembled to the groove 138*a* of the main body 138, and the base opening 132 and the slots 134 are disposed on the base 131. A method of assembling the base 131 to the groove 138*a* is to respectively configure a thread portion on the base 131 and the groove 138*a*, so that the base 131 and the groove 138*a* may be screwed to be assembled together, or a bump and a concave are configured for engagement. Certainly, the assembling method of the main body 138 and the base 131 can be changed according to an actual requirement, which is not limited by the present embodiment. Besides the aforementioned embodiment, a structure design of the positioning part of the lamp and an engagement and activating method of the positioning part and the bulb base are diversified, and applicable design patterns are introduced below with reference of other embodiments.

Figure 3A:
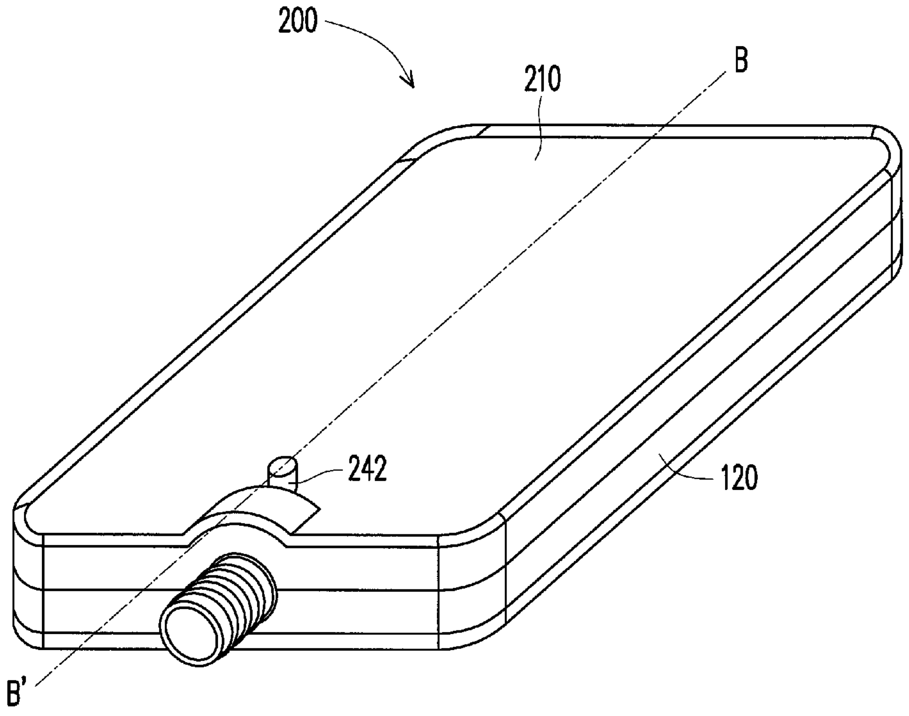
FIG. 3A is a three-dimensional view of a lamp according to another embodiment of the invention.
Figure 3B:
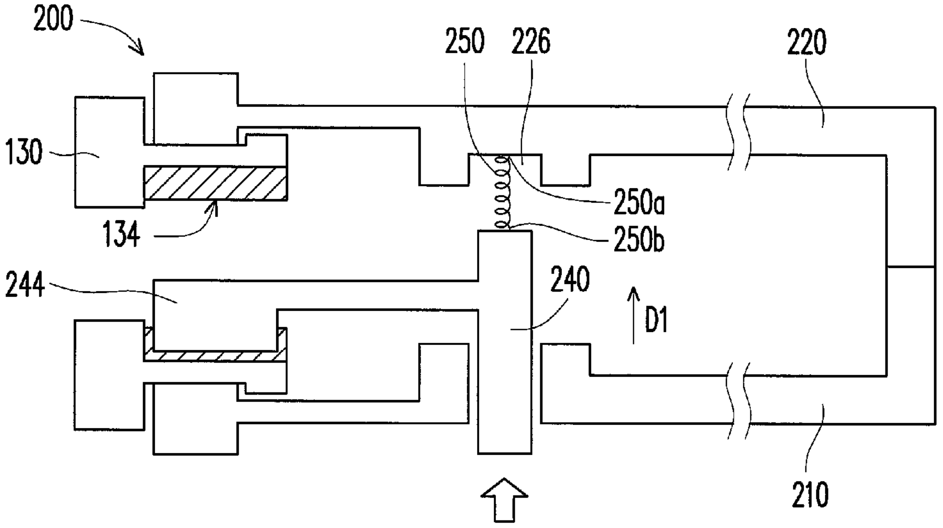
FIG. 3B is a cross-sectional view of the lamp of FIG. 3A along a line B-B'.
Figure 3C:
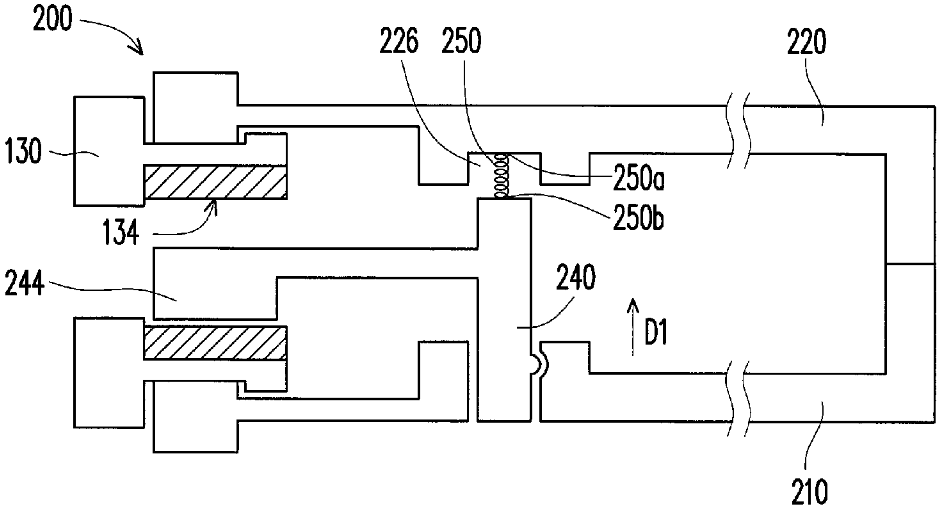
FIG. 3C is a cross-sectional view of the lamp of FIG. 3B when a positioning part moves.

FIG. 3A is a three-dimensional view of a lamp according to another embodiment of the invention. FIG. 3B is a cross-sectional view of the lamp of FIG. 3A along a line B-B'. FIG. 3C is a cross-sectional view of the lamp of FIG. 3B when a positioning part moves. Referring to FIG. 3A to FIG. 3C, a difference between the embodiment of FIG. 3A and the embodiment of FIG. 1A is that the lamp 200 of the present embodiment further includes an elastic part 250. The elastic part 250 is disposed in the second assembling tank 226, and two ends 250*a* and 250*b* of the elastic part 250 respectively lean against a positioning part 240 and a second housing 220. When the user presses a first push button 242 to move the positioning part 240 from a position shown in FIG. 3B to a position shown in FIG. 3C along the normal direction D1, the positioning part 240 presses the elastic part 250, and the elastic part 250 is compressed and deformed along the normal direction D1 to store elastic potential. Now, a buckle relation between a latch hook 244 and the slot 134 is released, and the first housing 210 and the second housing 220 that are assembled together can rotate relative to the bulb base 130.

When the user stops pressing the first push button 242, the elastic part 250 releases the elastic potential to drive the positioning part 240 to restore its original position. In detail, in the present embodiment, when the user presses the first push button 242, the positioning part 240 is pushed from a position shown in FIG. 3A to a position shown in FIG. 3B to release the buckle relation. After the user releases the first push button 242, the positioning part 240 can restore its original position through the elastic part 250, and the bulb base 130 is fixed to the first housing 210 and the second housing 220 that are assembled together. In this way, it is unnecessary to configure a second push button for pressing. Regarding a method of using the elastic part to drive the positioning part to fix the housing to the bulb base, another embodiment is introduced below for description.

Figure 4A:
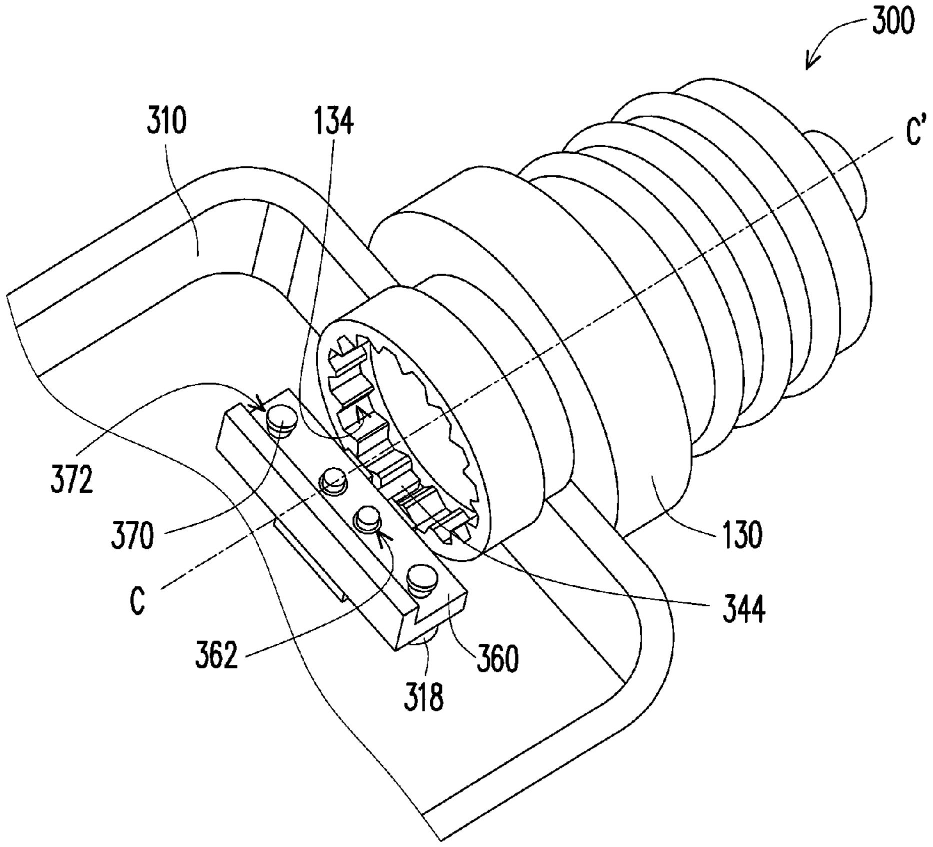
FIGS. 4A and 4B are partial three-dimensional views of a lamp according to another embodiment of the invention.
Figure 4B:
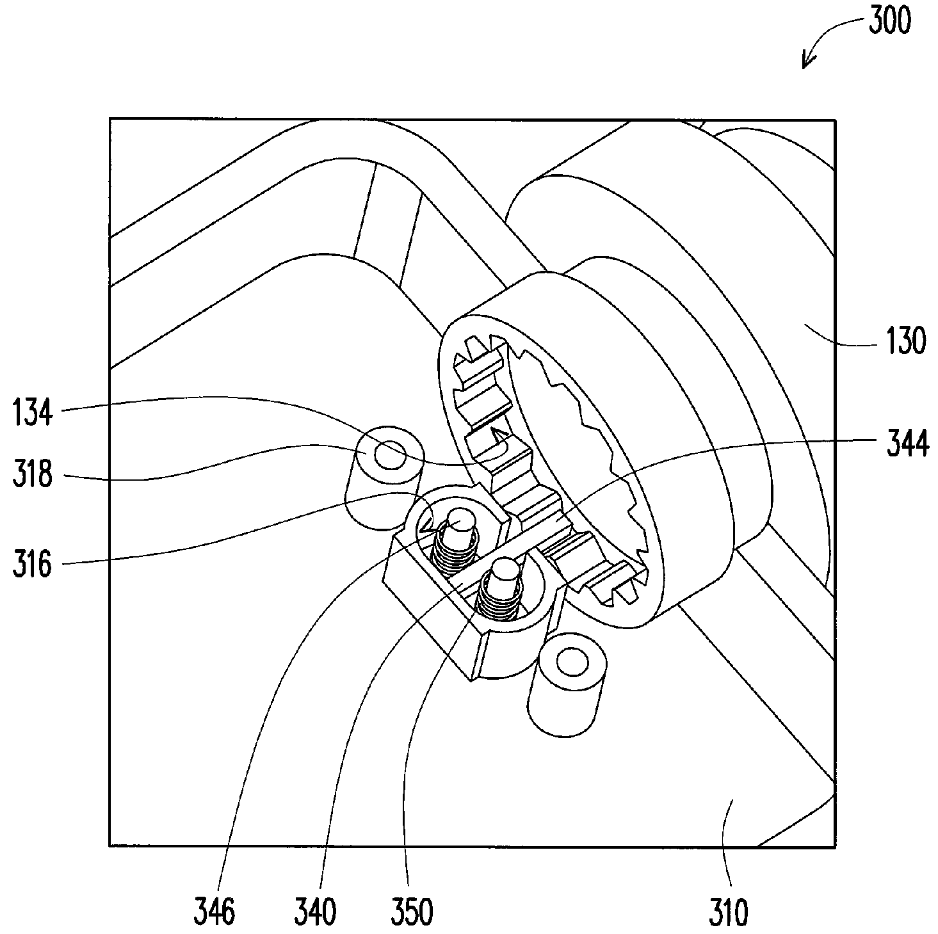
Figure 5A:
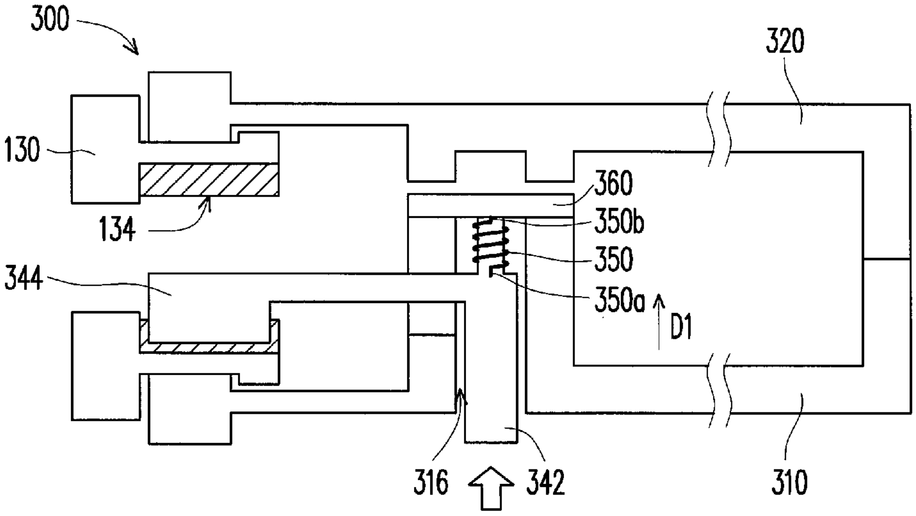
FIG. 5A is a cross-sectional view of the lamp of FIG. 4A along a line C-C'.
Figure 5B:
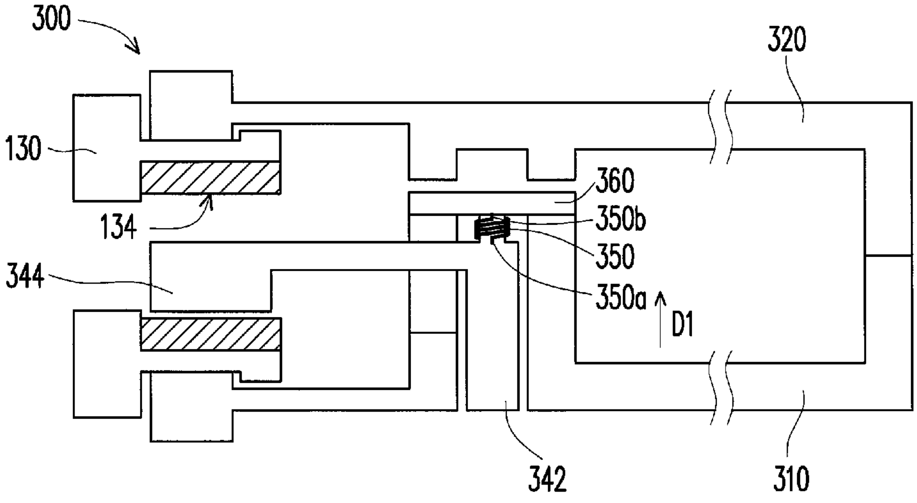
FIG. 5B is a cross-sectional view of the lamp of FIG. 5A when a positioning part moves.

FIGS. 4A and 4B are partial three-dimensional views of a lamp according to another embodiment of the invention. FIG. 5A is a cross-sectional view of the lamp of FIG. 4A along a line C-C'. FIG. 5B is a cross-sectional view of the lamp of FIG. 5A when a positioning part moves. Referring to FIG. 4A to FIG. 5B, a difference between the embodiment of FIG. 4A and the embodiment of FIG. 3A is that the lamp 300 of the present embodiment further includes a stop part 360, and a first housing 310 further has a pair of assembling pillars 318, wherein the pair of assembling pillars 318 is disposed on a first surface 312*a* and located at two opposite sides of a first assembling tank 316. The stop part 360 is detachably assembled to the assembling pillars 318 of the first housing 310 and leans against the first assembling tank 316 for limiting a moving distance of a positioning part 340 in the first assembling tank 316.

An assembling method of the stop part 360 and the assembling pillars 318 of the first housing 310 can be screw-lock. For example, the lamp 300 further has a multiple lock parts 370, which are, for example, screws, and the lock parts 370 penetrate through the stop part 360 and are locked into the assembling pillars 318. Each of the lock parts 370 has a head portion 372, and an outer diameter of the head portion 372 is greater than an outer diameter of the assembling pillar 318. Moreover, in another embodiment that is not illustrated, a screw and gasket locking method can be used, by which a screw penetrates through a gasket into the assembling pillar, and provides the gasket a pressure to fix the stop part. In another embodiment that is not illustrated, a hook can be used to fix the stop part, for example, the hook can be configured on the assembling pillar while the stop part has an opening, and the hook can penetrate through the opening of the stop part to buckle to the stop part, so as to form a structural interference. Moreover, the stop part and the assembling pillar can be assembled by a tightly firm, or the stop part and the assembling pillar can be slightly interfered for fixing.

Moreover, the lamp 300 of the present embodiment further includes at least one elastic part 350 (two elastic parts are illustrated in FIG. 4B), which is disposed in the first assembling tank 316, and two ends 350*a* and 350*b* of the elastic part 350 respectively lean against the positioning part 340 and the stop part 360. When the positioning part 340 presses the elastic part 350, the elastic part 350 is deformed along the normal direction D1. Moreover, in order to fix the two elastic parts 350, the positioning part 340 further has at least one convex pillar 346 (two convex pillars are illustrated in FIG. 4B), and the elastic part 350 sleeves the convex pillar 346. The convex pillar 346 is connected to a first push button 342 and a latch hook 344, and the convex pillar 346 extends towards a direction away from the first push button 342. The stop part 360 may further have at least one opening 362 corresponding to the convex pillar 346. An outer diameter of the opening 362 is greater than an outer diameter of the convex pillar 346 but is smaller than an outer diameter of the elastic part 350. In this way, the convex pillar 346 correspondingly penetrates through the opening 362, and the two ends 350*a* and 350*b* of the elastic part 350 lean against the stop part 360 and the positioning part 340.

When the user presses the first push button 342 to move the positioning part 340 from a position shown in FIG. 5A to a position shown in FIG. 5B, the convex pillar 346 penetrates through the opening 362 of the stop part 360, the positioning part 340 presses the elastic part 350, and the elastic part 350 is compressed and deformed along the normal direction D1 to store an elastic potential. Now, the buckle relation between the latch hook 344 and the slot 134 is released, and the first housing 310 and the second housing 320 that are assembled together can rotate relative to the bulb base 130. When the user stops pressing the first push button 342, the elastic part 350 releases the elastic potential to drive the positioning part 340 to restore its original position, and the bulb base 130 is fixed relative to the first housing 310 and the second housing 320 that are assembled together.

In summary, in the lamp of the invention, the positioning part and the elastic part are configured on the housing, and the positioning part can be buckled to the slot configured on the base opening to fix the housing on the base. When an angle of a light-emerging surface of the lamp is required to adjust, the user can press the push button to move the positioning part to release a buckle relation between the latch hook and the slot. In this way, the housing can be rotated relative to the bulb base. Compared to the conventional lamp that a relative angle between the bulb base and the housing cannot be adjusted after the bulb base and the housing are assembled, a structure of the lamp of the invention is different to that of the conventional lamp, and the housing can rotate relative to the bulb base to adjust the angle of the light-emerging surface of the lamp relative to the user, so that it is convenient in utilization. Moreover, by configuring the elastic part on the positioning part, the user can release the buckle relation between the housing and the bulb base through a single push button, so as to adjust a relative angle between the housing and the bulb base, by which more effort of the user is saved.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A lamp, comprising:

a first housing, comprising a first sidewall and a second sidewall, wherein the second sidewall is perpendicularly connected to the first sidewall, and the first sidewall has a first surface and a first assembling tank penetrating through the first surface, and the second sidewall has a first cave;

a second housing, detachably assembled to the first housing, and having a second cave, wherein the second cave and the first cave form a first opening;

a bulb base, embedded in the first opening, and assembled to the first housing and the second housing, wherein the bulb base has a base opening and a plurality of slots, and the slots are disposed on an inner sidewall of the base opening along a circular direction of the base opening; and a positioning part, disposed in the first assembling tank and adapted to move in the first assembling tank along a normal direction of the first surface, and having a first push button and a latch hook, wherein the first push button is disposed in the first assembling tank, an extending direction of the latch hook is perpendicular to the normal direction, and the latch hook is buckled to one of the slots.

2. The lamp as claimed in claim 1, wherein the second housing has a second assembling tank disposed opposite to the first assembling tank.

3. The lamp as claimed in claim 2, wherein the positioning part has a second push button connected to the first push button and the latch hook, and the second push button is disposed in the second assembling tank, and is adapted to move in the second assembling tank along the normal direction.

4. The lamp as claimed in claim 2, further comprising an elastic part disposed in the second assembling tank, wherein the positioning part leans against the elastic part, and when the positioning part presses the elastic part, the elastic part is deformed along the normal direction.

5. The lamp as claimed in claim 1, further comprising a stop part, and the first housing further having a pair of assembling pillars disposed on the first surface and located at two opposite sides of the first assembling tank, wherein the stop part is detachably assembled to the assembling pillars of the first housing and leans against the first assembling tank for limiting a moving distance of the positioning part in the first assembling tank.

6. The lamp as claimed in claim 5, further comprising at least one elastic part disposed in the first assembling tank, wherein two ends of the elastic part respectively lean against the positioning part and the stop part, and when the positioning part presses the elastic part, the elastic part is deformed along the normal direction.

7. The lamp as claimed in claim 6, wherein the positioning part has at least one convex pillar connected to the first push button and the latch hook, and the at least one convex pillar extends towards a direction away from the first push button, and the at least one elastic part sleeves the at least one convex pillar.

8. The lamp as claimed in claim 5, further comprising a pair of lock parts, wherein the lock parts penetrate through the stop part and are locked into the pair of assembling pillars.

9. The lamp as claimed in claim 1, wherein the bulb base comprises:

a main body, having a groove; and a base, detachably assembled to the groove of the main body, wherein the base opening and the slots are disposed on the base.

10. The lamp as claimed in claim 1, wherein each of the slots has at least one first slope, and when the first housing and the second housing assembled together rotate relative to the bulb base, the latch hook is adapted to move along the at least one first slope, and when the latch hook detaches the at least one first slope, the latch hook is buckled to a next slot.

11. The lamp as claimed in claim 10, wherein the latch hook of the positioning part has at least one second slope, and the second slope faces to the first slope.

* * * * *